J. E. & I. H. HIBBERT.
BAND SAW TENSIONING AND MOVING MACHINE.
APPLICATION FILED APR. 4, 1910.
971,841.
Patented Oct. 4, 1910.
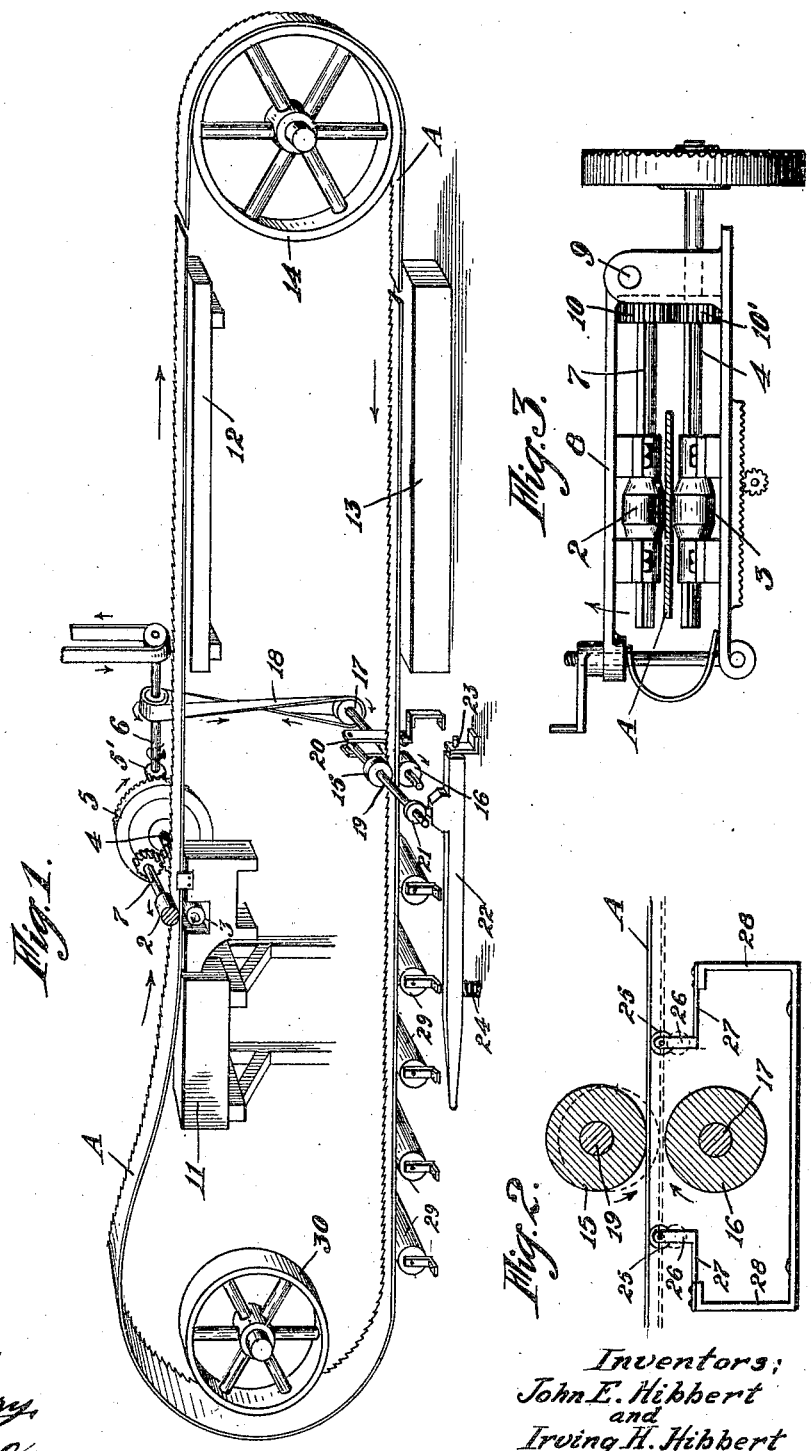
Witnesses:
Inventors:
John E. Hibbert
and
Irving H. Hibbert
By G. H. Strong
Their Attorney.

UNITED STATES PATENT OFFICE.

JOHN E. HIBBERT AND IRVING H. HIBBERT, OF STIRLING CITY, CALIFORNIA.

BAND-SAW TENSIONING AND MOVING MACHINE.

971,841.　　　　　　　Specification of Letters Patent.　　　Patented Oct. 4, 1910.

Application filed April 4, 1910. Serial No. 553,205.

*To all whom it may concern:*

Be it known that we, JOHN E. HIBBERT and IRVING H. HIBBERT, both citizens of the United States, residing at Stirling City, in the county of Butte and State of California, have invented new and useful Improvements in Band-Saw Tensioning and Moving Machines, of which the following is a specification.

This invention relates to a mechanism for stretching and moving band saws on a roller bench, and particularly pertains to a band saw tensioning system whereby the work that has heretofore been done by hand may be done mechanically, thus enabling one to tension the band saw in very much less time than can be done with the means now in use, or by hand.

The invention is particularly applicable for use in the filing departments of saw-mills and saw-works, and is designed for the purpose of facilitating the handling of large band saws of considerable length, and to enable a workman to properly tension the saw in much less time than has heretofore been possible.

It is the object of this invention to provide a combined saw stretching and moving apparatus in which the saw may be moved alternately in opposite directions so as to allow a repetition of the rolling action of the tension rollers on a section of the saw, or permit ready inspection of an already rolled section.

By the use of this invention the life of a saw is materially increased, which, in conjunction with the time and labor saved in working the saw, insures a great saving of expense to users of band saws, which feature constitutes the most important advantage of this invention.

The invention consists of the parts and the construction and combination of parts as hereinafter more fully described and claimed, having reference to the accompanying drawings, in which—

Figure 1 is a perspective view of the invention. Fig. 2 is a detail in section of the band saw moving device. Fig. 3 is a detail in side elevation of the saw stretcher.

In the drawings, A represents a band saw, which is shown in Fig. 1 as mounted on the workman's bench in position for rolling and tensioning. The upper plane of the saw passes between the rollers 2—3 of a saw stretcher, which may be of any suitable type, these rollers being adapted to revolve and move the saw in the direction indicated by the arrows, Fig. 1, and at the same time performing the function of tensioning the saw in the manner well known in machines of this character. The lower roller 3 is feathered on a shaft 4 which is rotated through gears 5—5' from a power shaft 6 driven in any desired manner. The upper roller 2 is feathered on a shaft 7 which is mounted on a lever 8 pivoted at 9, which lever is designed to be adjusted at its outer end so as to throw the roller 2 in or out of contact with the saw A, the shaft 7 being driven from the shaft 4 through gears 10—10', so that when the rollers 2 and 3 are contacting the saw A, the latter will be moved forward, as before mentioned.

The saw A, before passing between the rollers 2—3, passes over an anvil 11 which is located in front of the position occupied by an operator. After passing between the rollers 2—3 the saw is carried over a leveling slab 12 upon which the saw bears when a workman is working on the outside of the saw, a similar slab 13 being disposed beneath the lower plane of the saw to level the latter while working on the inside thereof, the saw passing around an idle roller 14 at any desired point after leaving the slab 12. From the slab 13, the saw passes between the rollers 15 and 16 of a band saw moving machine, the lower roller of which is mounted on a shaft 17 driven by a cross belt 18 from the power shaft 6, and the upper roller 15 is loosely mounted on a lever shaft 19 pivoted at one end to a bearing 20. The outer end of the lever 19 passes through a collar 21 mounted on an operating lever or treadle 22. The treadle 22 is suitably pivoted at 23 to a bracket or the like secured upon the floor or bench in such manner that the pivot 23 may be quickly removed and the treadle collar 21 slid off the lever 19, in putting in or removing saws from the bench.

The rollers 15 and 16 are normally held out of contact with the saw A in the following manner: Interposed between the free end of the lever 22 and the floor is a spring 24 which tends to lift the lever 22 upward, which movement is transmitted to the shaft 19 so as to lift the roller 15 clear of the saw. As the weight of the saw would naturally cause it to bear on the lower or drive roller 16 of the band saw mover, means are provided for automatically holding the saw out of contact with this roller when the stretcher rollers 2—3 are in action and the rollers 15—16 idle. These means are shown in detail in Fig. 2, and consist of idle rollers or guides 25 mounted on lugs 26 carried by upwardly tending spring arms 27 secured to standards 28 and disposed on each side of the roller 16. The spring arms 27 are of sufficient strength to support the saw at this point when pressure on the treadle 22 is released, and yet permit of depression of the rollers 25 when the saw A is pressed down on the roller 16 by the roller 15 and treadle 22. After leaving the saw-moving device just described, the saw passes over idle rollers 29 mounted on the floor or bench, and then passes around a direction pulley or guide roller 30 at the end of the bench, from whence it passes over the anvil 11 and a tension gage (not shown) and between the rollers 2—3 of the saw tensioning machine, as before described.

The operation of the invention is as follows: The drive-shaft 6 is caused to revolve by any suitable means so as to rotate the tensioning rollers 2—3 and the rollers 15—16 on the moving machine in the direction indicated by the arrows in Fig. 1. The lever 8 carrying the upper tension roller 2 being operated to cause the roller 2 to contact the saw A and press it down on the roller 3, the saw A is gripped so as to cause it to move forward in the direction of the arrows, Fig. 1, across the leveling slab 12, around the roller 14, over slab 13, between the rollers 15 and 16, around the direction roller 30, and back between the tensioning rollers 2—3 in continuous rotation. When it is necessary to re-roll a section of the band saw, or it is desired to inspect a rolled section, the tension roller 2 is raised out of contact with the saw by lifting the lever 8, thereby releasing the saw temporarily from the tensioning machine, and the operator presses upon the foot-lever 22 so as to cause the roller 15 to bear upon the top of the lower plane of the saw under the bench and press it into contact with the roller 16, whereupon roller 16, though rotating in the same direction as the rollers 2—3, acts on the lower band of the saw so as to reverse its direction, and moves the saw back any desired length.

We have put this system into successful practice, employing a bench equipped to roll a fourteen-inch sixty-foot band saw. Manifestly the system is adapted to any size or any length or width of saw. This system enables the operator to do rapid and smooth work.

The direction roller 30 as used is located at the front end of the bench, and is thirty inches in diameter, with a six-inch face, and the center of the pulley is about eight feet ten inches from the rollers 2—3. The use of this pulley, in conjunction with the band saw moving rollers 15—16, which latter, as before stated, act on the saw to run it in a direction opposite to the stretching rollers 2—3, enables one, after rolling one section, to return the saw by a simple pressure on the treadle 22, ready to make another roll, at the rate of 180 feet per minute, or slower, as the operator desires. By a light touch on the treadle the saw is pulled backward with ease a space of six inches in length, or even shorter, if the operator desires; the speed of the reverse movement of the saw being controlled to a nicety by varying the pressure on the treadle 22. By the use of the large direction pulley 30 on the extreme front end of the bench, the operator does not have to raise the saw while testing the tension for fast and loose places.

By this device a saw is run back and forth, or made to make several complete revolutions without the operator practically having to touch the saw with his hands. An operator is easily enabled to roll up a good, evenly-tensioned saw in from one to two hours by the use of this bench, whereas by all other methods in use the operation is a long, tedious, expensive one.

The roller 16 is covered with a yielding material, such as rubber, so as to provide a sufficient friction grip when the saw is pressed in contact therewith.

Whenever the pressure on the treadle 22 is released, spring 24 lifts the treadle and so raises roller 15 above the saw, while the spring arms 27 act on the underneath rollers 25 to lift the saw free from roller 16. Consequently, when the tension rollers 2—3 are working, the saw is not in contact with either of the rollers 15—16.

To detach the band saw moving rollers 15—16 from the saw, it is simply necessary to move the end of the lever 22 from its fulcrum 23 and slip the collar 21 off the end of shaft 19.

Having thus described our invention, what we claim and desire to secure by Letters Patent is—

1. A saw tensioning and moving machine consisting of the combination of tensioning rolls between which one plane of a band saw is passed, a pair of band saw moving rolls between which the other plane of the saw passes, direction pulleys for the saw, means for operating the tensioning rolls to move the saw in one direction, and means to move the band saw moving rolls to operate the saw in the opposite direction.

2. A saw tensioning and moving machine consisting of the combination of tensioning rolls between which one plane of a band saw is passed, a pair of band saw moving rolls between which the other plane of the saw passes, direction pulleys for the saw, means for operating the tensioning rolls to move the saw in one direction, means to move the band saw moving rolls to operate the saw in the opposite direction, and means in conjunction with the band saw moving rolls to maintain normally both the said rolls out of contact with the saw.

3. A saw tensioning and moving machine consisting of the combination of tensioning rolls between which one plane of a band saw is passed, a pair of band saw moving rolls between which the other plane of the saw passes, direction pulleys for the saw, means for operating the tensioning rolls to move the saw in one direction, means to move the band saw moving rolls to operate the saw in the opposite direction, and means in conjunction with the band saw moving rolls to maintain normally both the said rolls out of contact with the saw, said last-named means including yieldingly supported guides for the saw adjacent to the band saw moving rolls.

4. In a band saw tensioning and moving machine, the combination of a tensioning mechanism and a band saw moving mechanism, each of said mechanisms having respectively a pair of rolls between which the saw passes, direction pulleys over which the band saw moves, and means for operating said mechanisms at will, one of said mechanisms to move the saw in one direction, and the other of said mechanism to move it in the opposite direction.

5. The combination, of a band saw tensioning machine having rolls between which the saw passes, means to operate the rolls to move the saw in one direction, and other means operative on the saw mechanically to move the saw in the opposite direction.

6. The combination, of a driven shaft, a friction pulley secured thereon, and a pair of tensioning rolls between which a saw passes, of a pivoted lever disposed parallel to said shaft, a roller on said lever, means for moving the roller into contact with the friction pulley, and means acting normally to maintain the roller and pulley out of contact with the saw.

7. The combination, of a driven shaft, a friction pulley secured thereon, a pivoted lever disposed parallel to said shaft, a roller on said lever, means for moving the roller into contact with the friction pulley, and means acting normally to maintain the roller and pulley out of contact with a saw, placed therebetween said last-named means including yieldingly supported guide rollers beneath the saw and on each side of the friction pulley.

8. The combination of two coacting parallel friction rollers, means for moving one toward and from the other, means for maintaining one normally out of contact with the other, and yieldingly supported guide rollers on each side of said other and operative to hold a saw blade, when disposed between said rollers, out of contact with said other roller.

9. The combination of a driven shaft, a friction roller thereon, a second shaft parallel with the first and having one end pivotally mounted, a loose friction roller on said second shaft and disposed above the first-named roller, a treadle member having a loose fulcrum support and also having a loose detachable connection with the end of said second shaft, said treadle operative to move the two rollers into contact, means for maintaining the rollers normally separated, and yieldable independent saw supporting means on each side of the lower roller for maintaining the saw out of contact with the lower roller when pressure is released on the upper roller.

10. The combination of a driven shaft, a friction roller thereon, a second shaft parallel with the first and having one end pivotally mounted, a loose friction roller on said second shaft and disposed above the first-named roller, a treadle member having a loose detachable connection with the end of said second shaft, said treadle operative to move the two rollers into contact, means for maintaining the rollers normally separated, and independent saw supporting means on each side of the lower roller for maintaining the saw out of contact with the lower roller when pressure is released on the upper roller.

11. The combination of a driven shaft, a friction roller thereon, a second shaft parallel with the first and pivotally supported at one end, a roller carried by the second shaft and coöperating with the first-named roller to grip an interposed saw, means for pressing the rollers together, means for maintaining them normally separated, and yieldably supported saw supporting guides on each side of the first-named roller for maintaining the saw out of contact with said first-named roller when pressure on the second roller is released.

In testimony whereof we have hereunto set our hands in the presence of two subscribing witnesses.

JOHN E. HIBBERT.
IRVING H. HIBBERT.

Witnesses:
CLAY K. BUCHANAN,
H. W. NASH.